United States Patent

Sakai et al.

[11] Patent Number: 5,238,884
[45] Date of Patent: * Aug. 24, 1993

[54] SILICON NITRIDE BODIES AND A PROCESS FOR PRODUCING THE SAME

[75] Inventors: Hiroaki Sakai; Manabu Isomura, both of Nagoya, Japan

[73] Assignee: NGK Insulators, Ltd., Japan

[*] Notice: The portion of the term of this patent subsequent to Mar. 17, 2009 has been disclaimed.

[21] Appl. No.: 873,656

[22] Filed: Apr. 22, 1992

Related U.S. Application Data

[63] Continuation of Ser. No. 627,250, Dec. 14, 1990, abandoned.

[30] Foreign Application Priority Data

Jan. 23, 1990 [JP] Japan .................. 2-11780

[51] Int. Cl.$^5$ .................. C04B 35/58
[52] U.S. Cl. .................. 501/97; 501/98
[58] Field of Search .................. 501/92, 97, 98

[56] References Cited

U.S. PATENT DOCUMENTS

| | | | |
|---|---|---|---|
| 4,608,354 | 8/1986 | Avella et al. | 501/97 |
| 4,806,510 | 2/1989 | Kanai et al. | 501/97 |
| 4,814,301 | 3/1989 | Steinmann et al. | 501/92 |
| 4,845,060 | 7/1985 | Wickel et al. | 501/97 |
| 4,883,776 | 11/1989 | Pyzik et al. | 501/97 X |
| 4,891,342 | 1/1990 | Yokoyama | 501/97 |
| 4,980,322 | 12/1990 | Wickel et al. | 501/97 |
| 5,017,530 | 5/1991 | Arakawa et al. | 501/97 X |
| 5,045,513 | 9/1991 | Mizuno et al. | 501/97 X |
| 5,096,859 | 3/1992 | Sakai et al. | 501/92 |

FOREIGN PATENT DOCUMENTS

| | | | |
|---|---|---|---|
| 52-122299 | 10/1977 | Japan . | |
| 0183369 | 11/1982 | Japan | 501/97 |
| 0088171 | 5/1983 | Japan | 501/97 |
| 0145965 | 8/1985 | Japan | 501/97 |
| 63-021254 | 1/1988 | Japan . | |
| 8000080 | 1/1980 | PCT Int'l Appl. | 501/97 |

OTHER PUBLICATIONS

Ziegler et al., "Effect of Phase Composition and Microstructure On the Thermal Diffusivity of Silicon Nitride", J. of Mat. Science, 16 (1981) pp. 495–503.

*Primary Examiner*—Karl Group
*Attorney, Agent, or Firm*—Parkhurst, Wendel & Rossi

[57] ABSTRACT

A silicon nitride sintered body wherein a number of grain boundaries of $Si_3N_4$ per a length of 10 $\mu m$ is not more than 20 when measured along a straight line drawn in an arbitrary section of the silicon nitride sintered body. A process is disclosed for producing such a silicon nitride sintered body, which includes the steps of grinding and mixing a raw material of silicon nitride and not more than 0.3 wt. % of Al when calculated as $Al_2O_3$, shaping the mixture, and firing the shaped body. The silicon nitride sintered body involves not only ordinary silicon nitride sintered bodies, but also vapor deposited films of silicon nitride formed by CVD or the like, flame sprayed films of silicon nitride formed by flame spraying, and the like.

12 Claims, No Drawings

SILICON NITRIDE BODIES AND A PROCESS FOR PRODUCING THE SAME

This is a continuation of application Ser. No. 07/627,250 filed Dec. 14, 1990, now abandoned.

BACKGROUND OF THE INVENTION

1. Field of the Invention

The present invention relates to silicon nitride bodies favorably usable as high temperature structural materials, and to a process for producing the same.

2. Related Art Statement

Various ceramic materials have been used as high temperature structural materials. High strength and high fracture toughness as well as good thermal shock resistance are cited as characteristics required for high temperature structural ceramics. High heat conductivity, low coefficient of thermal expansion, low Young's modulus, etc. are required to improve the thermal shock resistance. BeO, AlN, SiC, etc. have been heretofore known as ceramic materials having high thermal conductivity.

However, among the above-mentioned ceramic materials having high thermal conductivity, BeO and AlN have low strength, and SiC has high strength, but its fracture toughness is low.

On the other hand, although $Si_3N_4$ is known as a material having high strength and high toughness, it generally has low thermal conductivity. Accordingly, hereto known silicon nitride sintered bodies have a problem in thermal shock resistance.

SUMMARY OF THE INVENTION

The present invention is to solve the above-mentioned problems, and to provide silicon nitride bodies favorably usable as high temperature structural materials by improving the defect in the thermal shock resistance of $Si_3N_4$ through increasing the thermal conductivity thereof. The invention is also to provide a process for producing such silicon nitride bodies.

The silicon nitride body according to the present invention is characterized in that the number of grain boundaries of $Si_3N_4$ per a length of 10 µm is not more than 20 when measured along a straight line drawn in an arbitrary section of the silicon nitride body.

The process for producing the silicon nitride bodies according to the present invention comprises the steps of grinding and mixing a raw material of silicon nitride containing not more than 0.3 wt. % of Al when calculated as $Al_2O_3$, shaping the mixture, and firing the shaped body.

The term "silicon nitride bodies" used herein means a concept involving not only ordinary silicon nitride sintered bodies, but also vapor deposited films of silicon nitride formed by CVD or the like, flame sprayed films of silicon nitride formed by flame spraying, etc. besides the sintered bodies.

The present inventors have discovered that in the above-mentioned silicon nitride bodies, when the number of the grain boundaries of $Si_3N_4$ per the length of 10 µm is not more than 20 when measured along a straight line drawn in an arbitrary section thereof, heat dissipation at the grain boundaries becomes smaller, so that highly thermal conductive silicon nitride bodies having high thermal conductivity preferably not less than 0.15 cal/cm·sec·°C. can be obtained. For this purpose, it is necessary to make grains of $Si_3N_4$ greater. This can be accomplished, for example, by raising the sintering temperature and prolonging the sintering time in the case of the sintering process.

Since the Al component in the silicon nitride body such as the silicon nitride sintered body is solid solved into grains of $Si_3N_4$ to produce sialon having low thermal conductivity, the thermal conductivity of the silicon nitride body is deteriorated For this reason, it is preferable to suppress the content of Al in the silicon nitride body to not more than 0.3 wt. % when calculated as $Al_2O_3$, because reduction in the thermal conductivity can be prevented in this case. Further, it is necessary to use a raw material of silicon nitride containing not more than 0.3 wt. % of Al in the producing process when calculated as $Al_2O_3$. Furthermore, it is preferably to grind the raw material with grinding media made of silicon nitride.

As to $Si_3N_4$ there are two kinds of an $\alpha$ type and a $\beta$ type, and the heat conductivity of the $\alpha$ type is smaller than that of the $\beta$ type. Therefore, the higher the $\beta$ conversion rate, the higher the heat conductivity. For this reason, $Si_3N_4$ is preferably $\beta$-$Si_3N_4$.

These and other objects, features and advantages of the invention will be appreciated upon reading of the following description of the invention, with the understanding that some modifications, variations and changes of the same could be made by the skilled person in the art to which the invention pertains without departing from the spirit of the invention or the scope of claims appended hereto.

DETAILED DESCRIPTION OF THE INVENTION

In the following, actual examples of the present invention will be explained.

EXPERIMENT 1

A sintering aid containing not more than 0.01 wt. % of impurity Al was added and mixed into a raw material of silicon nitride containing not more than 0.01 wt. % of impurity Al at ratios given in Table 1. The sintering aid was selected from raw materials of $Y_2O_3$, $Yb_2O_3$. SiC, MgO and $ZrO_2$. The mixture was ground with a vibration mill by using grinding media made of silicon nitride porcelain and a nylon resin vessel having an inner volume of 1.2 ml. To 200 g of the raw material mixture were 1.8 kg of the grinding media and 300 ml of water, and the above grinding was effected at a vibration frequency of 1,200/minutes for 3 hours. Then, water was evaporated, and the mixture was granulated to the grain diameter of 150 µm in the form of a powder to be shaped. Next, the powder was isostatically pressed under a pressure of 7 tons/$cm^2$ to form a shaped body of $50 \times 40 \times 6$ mm. The shaped body was fired in a nitrogen atmosphere under conditions of temperature, time and pressure shown in Table 1. Thereby, sintered bodies in Example Nos. 1–11 and Comparative Example Nos. 12–14 were obtained.

With respect to the thus obtained sintered bodies, the number of grain boundaries per a length of 10 µm along a straight line drawn in an arbitrary section, thermal conductivity, $\beta$ conversion rate, four point bending strength and thermal shock resistance were measured. Results are also shown in Table 1.

The number of the grain boundaries was measured as follows:

First, a microstructure of an arbitrary section of the silicon nitride body was photographed by a scanning type electron microscope at a magnitude by which grains of $Si_3N_4$ were able to be discerned one by one. that did not substantially provoke reduction in strength at room temperature after quenching was measured.

TABLE 1

| Run No. | | Sintering aid (wt %) | Firing conditions temperature (°C.) | time (hr) | pressure (atm) | Thermal conductivity (cal/cm · sec. °C.) | Number of grain boundaries per 10 μm | Content of Al in sintered body when calculated as $Al_2O_3$ (wt %) | β conversion rate (%) | Strength at room temperature (MPa) | Thermal shock resistance ΔT °C. |
|---|---|---|---|---|---|---|---|---|---|---|---|
| Example | 1 | $Y_2O_3$:$Yb_2O_3$ = 2.2:9.4 | 1900 | 3 | 10 | 0.17 | 12 | <0.1 | 100 | 700 | 1250 |
| | 2 | $Y_2O_3$:$Yb_2O_3$ = 2.2:9.4 | 1900 | 4 | 10 | 0.19 | 9 | <0.1 | 100 | 680 | 1250 |
| | 3 | $Y_2O_3$:$Yb_2O_3$ = 2.2:9.4 | 1900 | 10 | 10 | 0.20 | 7 | <0.1 | 100 | 650 | 1250 |
| | 4 | $Y_2O_3$:$Yb_2O_3$ = 2.2:9.4 | 1800 | 4 | 10 | 0.16 | 13 | <0.1 | 100 | 600 | 1250 |
| | 5 | $Y_2O_3$:$Yb_2O_3$ = 2.2:9.4 | 1800 | 8 | 10 | 0.18 | 10 | <0.1 | 100 | 590 | 1250 |
| | 6 | $Y_2O_3$:$Yb_2O_3$ = 2.2:9.4 | 2000 | 3 | 100 | 0.19 | 9 | <0.1 | 100 | 680 | 1250 |
| | 7 | $Y_2O_3$:$Yb_2O_3$:SiC = 3.4:14:1 | 1900 | 3 | 10 | 0.20 | 8 | <0.1 | 100 | 700 | 1300 |
| | 8 | $Y_2O_3$:$Yb_2O_3$:SiC = 3.4:14:1 | 1900 | 8 | 10 | 0.23 | 7 | <0.1 | 100 | 650 | 1300 |
| | 9 | $Y_2O_3$:MgO:$ZrO_2$ = 5:3:0.3 | 1800 | 3 | 5 | 0.16 | 15 | <0.1 | 100 | 880 | 1200 |
| | 10 | $Y_2O_3$:MgO:$ZrO_2$ = 5:3:0.3 | 1800 | 5 | 5 | 0.17 | 13 | <0.1 | 100 | 880 | 1200 |
| | 11 | $Y_2O_3$:MgO:$ZrO_2$ = 5:3:0.3 | 1700 | 3 | 1 | 0.15 | 20 | <0.1 | 100 | 870 | 1200 |
| Comparative | 12 | $Y_2O_3$:$Yb_2O_3$ = 2.2:9.4 | 1800 | 1 | 10 | 0.12 | 27 | <0.1 | 100 | 600 | 1000 |
| | 13 | $Y_2O_3$:MgO:$ZrO_2$ = 5:3:0.3 | 1700 | 0.5 | 1 | 0.09 | 30 | <0.1 | 100 | 830 | 1000 |
| Example | 14 | $Y_2O_3$:MgO:$ZrO_2$ = 5:3:0.3 | 1630 | 3 | 1 | 0.07 | 42 | <0.1 | 90 | 780 | 950 |

Next, a straight line was drawn in the photograph, and the number of the grain boundaries through which the straight line passed was counted. The straight line was drawn over plural photographs continuously connected until the number of the grain boundaries exceeded 1,000, and that total distance L (μm) of the straight line which was required to count 1,000 grain boundaries was determined. Then, the number of the grain boundaries per 10 μm was determined by (1000/L)×10. For example, if a straight line having a length of 500 μm is required to count 1,000 grain boundaries, the number of the grain boundaries per 10 μm is 20.

The thermal conductivity was measured by using a heat constant measuring device according to a laser-flash process. The shape of each test piece was 10 mm in diameter and 3 mm in thickness. One surface of the test piece was coated with carbon by sprayer, and a thermocouple was bonded to the opposite side by using a silver paste.

The β conversion rate was measured by X-ray diffraction. Diffraction intensities α(210) and α(201) of a (210) plane and a (201) plane of α-$Si_3N_4$, respectively, and diffraction intensities β(101) and β(210) of a (101) plane and a (210) plane of β-$Si_3N_4$, respectively, were measured, and the β conversion rate was determined by the following equation.

β conversion rate = β(101)+β(210)]/[α(210)+α(201)+β(101)+β(210)]×100

The four point bending strength was measured according to a "process for testing bending strengths of fine ceramics" prescribed in JIS R-1601. The thermal shock resistance was measured by an underwater quenching method in which a temperature difference From results in Table 1, it is seen that Example Nos. 1–11 in which the number of the grain boundaries per 10 μm was not more than 20 had better thermal shock resistance as compared with Comparative Example Nos. 12–14.

Further, when Example Nos. 1–3 are compared, it is seen that the number of the grain boundaries per 10 μm is decreased by prolonging the firing time even at the same firing temperature, so that high thermal conductivity is attained. Further, when Example Nos. 2 and 4 are compared, it is seen that the number of the grain boundaries is decreased by raising the firing temperature even for the same firing time, so that high thermal conductivity is attained. To the contrary, the grain boundaries per 10 μm is greater and the thermal conductivity is low in the case of Comparative Example No. 13 having a shorter firing time and Comparative Example No. 14 having a lower firing temperature.

EXPERIMENT 2

In order to examine influences of the content of Al in silicon nitride sintered bodies, raw materials of $Y_2O_3$ and $Yb_2O_3$ containing not more than 0.01 wt. % of impurity Al were added to each of five kinds of powdery raw materials of silicon nitride in which Al was contained in an amount of 0.01 wt. %, 0.05 wt. %, 0.07 wt. %, 0.12 wt. %, or 0.15 wt. %. Then, a shaped body was formed from the thus obtained mixture, and fired at 1,900° C. in a nitrogen atmosphere for 3 hours in the same manner as in Experiment 1, thereby obtaining sintered bodies in Example Nos 21–25 shown in Table 2.

With respect to the sintered bodies obtained above, the thermal conductivity, the number of grain boundaries per 10 μm, the β conversion rate and the content of Al in the sintered body were measured in the same manner as in Experiment 1. Results are shown in Table 2.

TABLE 2

| Run No. | | Content of Al in raw material of silicon nitride (Wt %) | Thermal conductivity (cal/cm · sec. °C.) | Number of grain boundaries per 10 μm | β conversion rate (%) | Content of Al in sintered body when calculated as $Al_2O_3$ (wt %) |
|---|---|---|---|---|---|---|
| Example | 21 | 0.01 | 0.17 | 12 | 100 | <0.1 |
| | 22 | 0.05 | 0.17 | 12 | 100 | 0.1 |

TABLE 2-continued

| Run No. | Content of Al in raw material of silicon nitride (Wt %) | Thermal conductivity (cal/cm · sec. °C.) | Number of grain boundaries per 10 μm | β conversion rate (%) | Content of Al in sintered body when calculated as Al$_2$O$_3$ (wt %) |
| --- | --- | --- | --- | --- | --- |
| 23 | 0.07 | 0.16 | 15 | 100 | 0.2 |
| 24 | 0.12 | 0.15 | 15 | 100 | 0.3 |
| 25 | 0.15 | 0.15 | 20 | 100 | 0.3 |

From the results in Table 2, it is seen that among the sintered bodies satisfying the number of the grain boundaries in the the present invention, the greater the content of Al, the lower the thermal conductivity, and when the content of Al is not more than 0.3 wt. % as calculated in the form of Al$_2$O$_3$, high thermal conductivity can be attained.

EXPERIMENT 3

In order to examine influences of grinding media used, a raw material of silicon nitride containing not more than 0.01 wt. % of Al as an impurity was formulated at the same compounding recipe with use of the same additives as in Example 2. Example Nos. 26–30 shown in Table 3 were obtained from the thus obtained mixture in the same manner as in Experiment 1 with use of Si$_3$N$_4$ grinding media containing MgO as additive, Si$_3$N$_4$ grinding media containing MgO and Al$_2$O$_3$ as additive, Si$_3$N$_4$ grinding media containing Y$_2$O$_3$ and Al$_2$O$_3$ as additive, or Al$_2$O$_3$ grinding media, respectively.

With respect to the sintered bodies obtained above, the thermal conductivity, the number of grain boundaries per 10 μm, the β conversion rate and the content of Al in the sintered body were measured in the same manner as in Experiment 1. Results are shown in Table 3.

TABLE 3

| Run No. | | Kind of grinding media | Grinding time (hour) | Thermal conductivity (cal/cm · sec. °C.) | Number of grain boundaries per 10 μm | β conversion rate (%) | Content of Al in sintered body when calculated as Al$_2$O$_3$ (wt %) |
| --- | --- | --- | --- | --- | --- | --- | --- |
| Example | 26 | MgO base Si$_3$N$_4$ | 3 | 0.19 | 9 | 100 | <0.1 |
| | 27 | MgO—Al$_2$O$_3$ base Si$_3$N$_4$ | 3 | 0.18 | 9 | 100 | 0.1 |
| | 28 | Y$_2$O$_3$—Al$_2$O$_3$ base Si$_3$N$_4$ | 3 | 0.18 | 9 | 100 | 0.1 |
| | 29 | Al$_2$O$_3$ | 1 | 0.16 | 15 | 100 | 0.2 |
| | 30 | Al$_2$O$_3$ | 3 | 0.15 | 15 | 100 | 0.3 |

From the results in Table 3, it is seen that since Example Nos. 26–28 using the Si$_3$N$_4$ grinding media had the small mixing amount of Al from the grinding media during the grinding, the thermal conductivity was not substantially lowered. On the other hand, it is seen that since Example Nos. 29 and 30 using the Al$_2$O$_3$ grinding media had the great mixing amount of Al, the thermal conductivity is lowered.

The present invention is not limited to the above mentioned examples only, but various modifications and variations can be made. For example, although the above-mentioned examples are directed to the silicon nitride sintered bodies, thermal conductivity of vapor deposited films of silicon nitride formed by CVD or the like as well as flame sprayed films of silicon nitride can be increased as long as the requirements of the present invention are satisfied.

As is clear from the foregoing explanation, according to the present invention, when the number of the grain boundaries of Si$_3$N$_4$ in the silicon nitride body per 10 μm is not more than 20 when measured along a straight line drawn in an arbitrary section, and preferably when the content of Al is also not more than 0.3 wt. % as calculated in the form Al$_2$O$_3$, the silicon nitride body having high thermal conductivity of, for example, not less than 0.15 cal/cm·sec·°C. can be obtained. Thus, the silicon nitride bodies according to the present invention can favorably be used as high temperature structural bodies.

What is claimed is:

1. A silicon nitride sintered body, consisting essentially of β-Si$_3$N$_4$, Zr in an amount of not more than 0.3 wt. %, calculated as ZrO$_2$, and 5 wt. % to 17.4 wt. % of at least one material selected from the group consisting of Y$_2$O$_3$ and Yb$_2$O$_3$, said sintered body being fired at a temperature of at least 1700° C. for a time of at least 3 hours;

wherein (i) a content of Al in the sintered body is not more than 0.3 wt. % when calculated as Al$_2$O$_3$, (ii) an average number of grain boundaries of Si$_3$Nin said sintered body per a length of 10 μm as measured along a straight line drawn in an arbitrary section of said sintered body is not more than 20, said straight line having a length determined by a total distance required to count 1,000 grain boundaries in said sintered body, and (iii) said sintered body has a thermal shock resistance ΔT(°C.) of not less than 1,200.

2. The silicon nitride sintered body of claim 1, consisting essentially of Yb$_2$O$_3$.

3. The silicon nitride sintered body of claim 1, wherein said Yb$_2$O$_3$ is present in an amount of 9.4–14 wt. %.

4. The silicon nitride sintered body of claim 1, wherein said Y$_2$O$_3$ is present in an amount of 2.2–5.0 wt. %.

5. The silicon nitride sintered body of claim 1, further comprising at least one member selected from the group consisting of MgO, and Sic.

6. The silicon nitride sintered body of claim 5, wherein MgO is present in an amount of 3.0 wt. %.

7. The silicon nitride sintered body of claim 5, wherein ZrO$_2$ is present in an amount of 0.3 wt. %.

8. The silicon nitride sintered body of claim 1, wherein said sintered body has a thermal conductivity of not less than 0.15 cal/cm·sec·°C.

9. A process for producing a silicon nitride sintered body consisting essentially of $\beta$-$Si_3N_4$ and at least one material selected from the group consisting of $Y_2O_3$ and $Yb_2O_3$, said method comprising the steps of:
preparing a mixture consisting essentially of $Si_3N_4$ containing not more than 0.3 wt. % Al, calculated as $Al_2O_3$, Zr in an amount not more than 0.3 wt. %, calculated as $ZrO_2$, and 5 wt. % to 17.4 wt. % of at least one material selected from the group consisting of $Y_2O_3$ and $Yb_2O_3$;
shaping said mixture to form a shaped body; and
firing said shaped body at a temperature of at least 1700° C. for a time of at least 3 hours.

10. The process of claim 9, wherein said shaped body is fired at a temperature in a range of 1700°–2000° C. and for a time in a range of 3–10 hours.

11. The process of claim 9, wherein said mixture is prepared by grinding and mixing $Si_3N_4$ and at least one of the materials selected from the group consisting of $Y_2O_3$ and $Yb_2O_3$ by means of silicon nitride grinding media.

12. A silicon nitride sintered body, consisting essentially of $\beta$-$Si_3N_4$, Zr in an amount of not more than 0.3 wt. %, calculated as $ZrO_2$, SiC in an amount of about 1.0 wt. % and at least one material selected from the group consisting of $Y_2O_3$ and $Yb_2O_3$, wherein an average number of grain boundaries of $Si_3N_4$ in said sintered body per a length of 10 $\mu$m as measured along a straight line drawn in an arbitrary section of said sintered body is not more than 20, said straight line having a length determined by a total distance required to count 1,000 grain boundaries in said sintered body, and said sintered body has a thermal shock resistance $\Delta T$(°C.) of not less than 1,200.

* * * * *